(12) United States Patent
Oberheim

(10) Patent No.: US 8,826,547 B2
(45) Date of Patent: Sep. 9, 2014

(54) IMPACT ABSORPTION DRIVE MECHANISM FOR A RECIPROCATING TOOL

(75) Inventor: Stephen C. Oberheim, Des Plaines, IL (US)

(73) Assignee: Robert Bosch GmbH, Stuttgart (DE)

( * ) Notice: Subject to any disclaimer, the term of this patent is extended or adjusted under 35 U.S.C. 154(b) by 697 days.

(21) Appl. No.: 12/277,502

(22) Filed: Nov. 25, 2008

(65) Prior Publication Data

US 2010/0126027 A1 May 27, 2010

(51) Int. Cl.
*B23D 49/10* (2006.01)
*B23D 49/16* (2006.01)
*B23D 51/00* (2006.01)

(52) U.S. Cl.
CPC ............... *B23D 49/16* (2013.01); *B23D 51/00* (2013.01)
USPC ................................................ 30/392; 30/393

(58) Field of Classification Search
USPC ................................. 30/392, 393, 394; 83/543
See application file for complete search history.

(56) References Cited

U.S. PATENT DOCUMENTS

| | | | |
|---|---|---|---|
| 1,389,055 A | 8/1921 | Kugler | |
| 1,646,302 A | 10/1927 | McKale | |
| 1,892,069 A | 12/1932 | Miller | |
| 2,372,472 A | 3/1945 | Campbell | |
| 2,383,136 A | 8/1945 | Laurain | |
| 2,793,661 A * | 5/1957 | Olson | 30/393 |
| 3,080,897 A * | 3/1963 | Winter | 83/750 |
| 3,850,255 A * | 11/1974 | Koehler | 173/110 |
| 4,726,430 A * | 2/1988 | Hendrikx et al. | 173/109 |
| 4,776,408 A * | 10/1988 | Elkin et al. | 173/211 |
| 4,790,700 A | 12/1988 | Schwartzman | |
| 5,127,279 A * | 7/1992 | Barthruff | 74/6 |
| 5,607,023 A | 3/1997 | Palm | 173/178 |
| 5,782,000 A * | 7/1998 | Bednar | 30/393 |
| 6,091,574 A | 7/2000 | Misso | |
| 6,234,255 B1* | 5/2001 | Feldmann et al. | 173/114 |
| 6,424,112 B1 | 7/2002 | Schauer | |
| 7,017,344 B2 | 3/2006 | Pellizzari et al. | |
| 7,096,590 B2* | 8/2006 | Marinkovich et al. | 30/392 |
| 7,117,601 B2* | 10/2006 | Hai-Chun | 30/392 |
| 7,168,169 B2* | 1/2007 | Moreno | 30/394 |
| 7,284,527 B2 | 10/2007 | Herrera et al. | |
| 7,506,693 B2* | 3/2009 | Stirm | 173/48 |
| 7,793,420 B2* | 9/2010 | Griep et al. | 30/394 |
| 2008/0052923 A1* | 3/2008 | Moreno | 30/392 |

\* cited by examiner

*Primary Examiner* — Kenneth E. Peterson
*Assistant Examiner* — Jennifer Swinney
(74) *Attorney, Agent, or Firm* — Maginot, Moore & Beck

(57) ABSTRACT

Embodiments are disclosed for a reciprocating saw that comprises a housing, a drive mechanism in the housing, a motor in the housing for driving the drive mechanism, an elongated plunger located in the housing for reciprocating motion and having a front end portion for attaching a saw blade for cutting material, the saw having an energy absorbing compliant configuration at least partially isolating a portion of the plunger and the drive mechanism from high energy impulses that can be produced by the saw blade being bound in the material being sawed during operation of the saw.

11 Claims, 5 Drawing Sheets

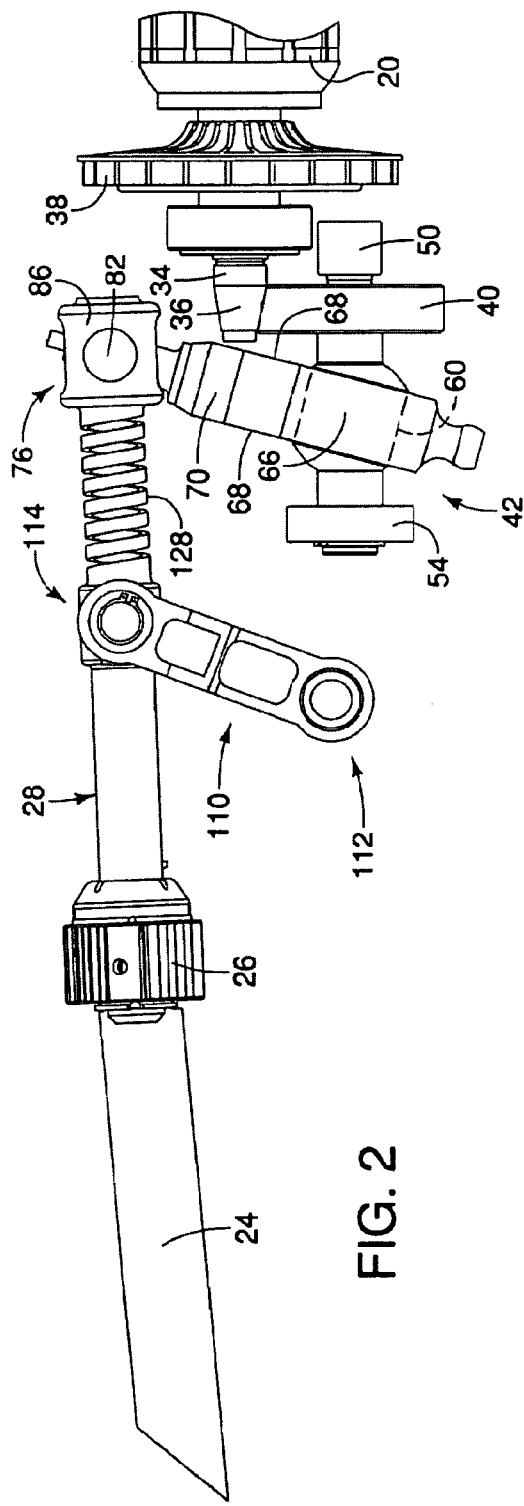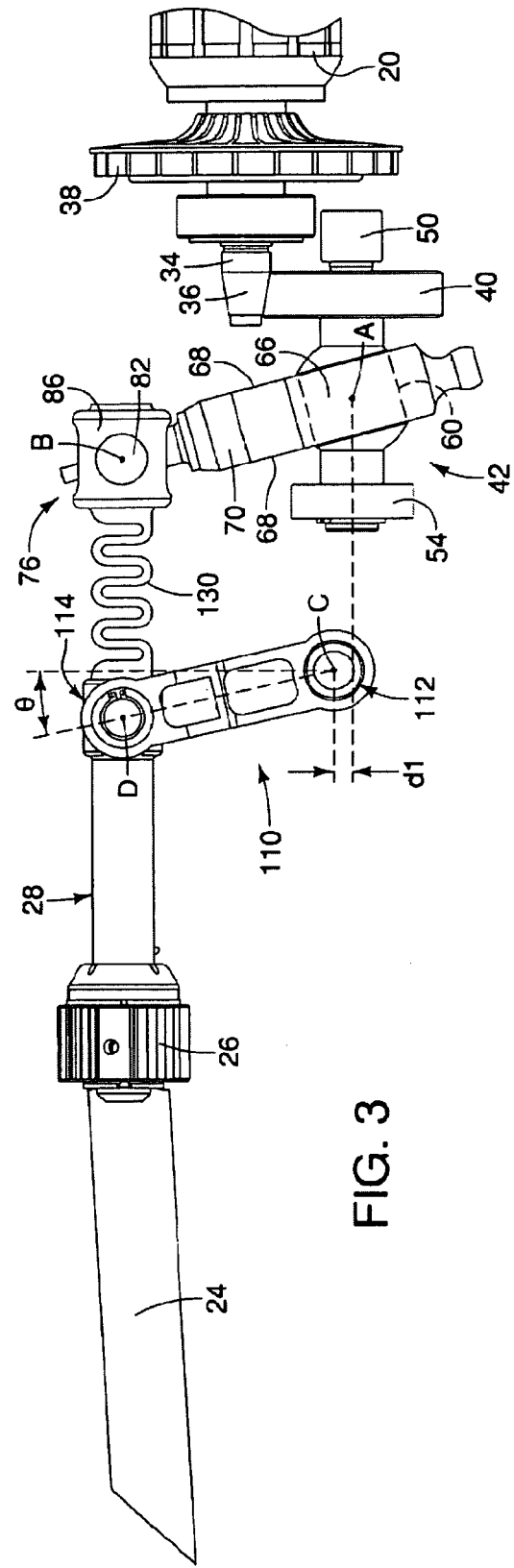

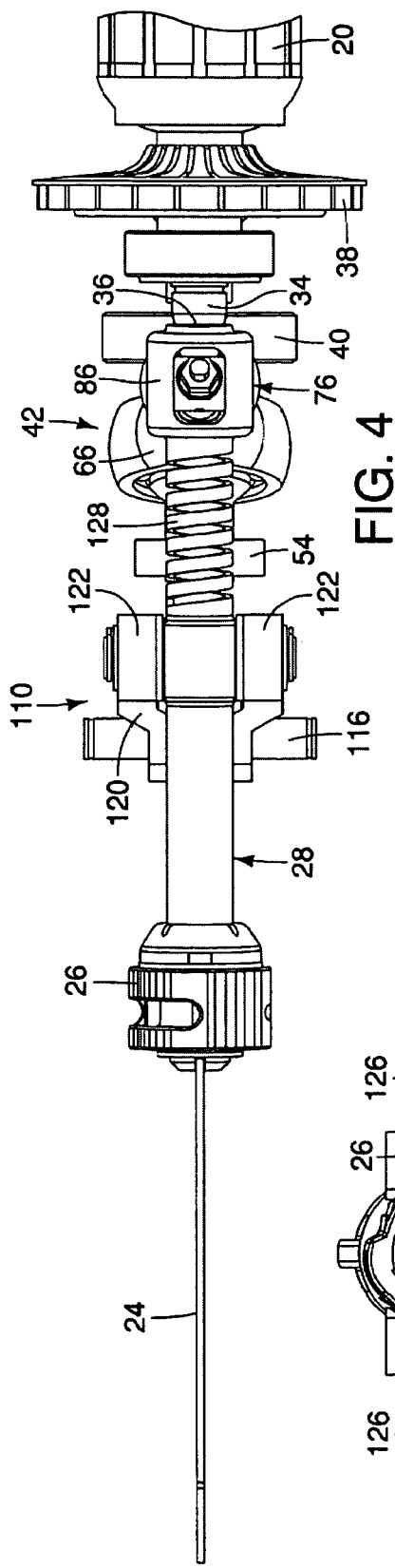
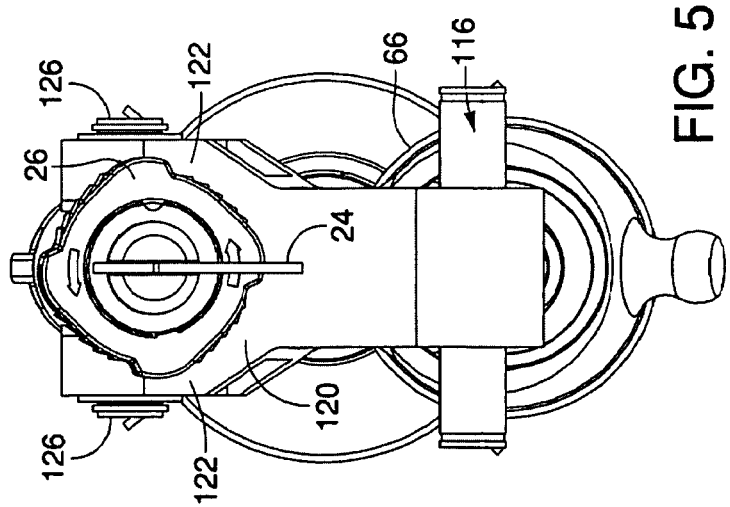
FIG. 4
FIG. 5

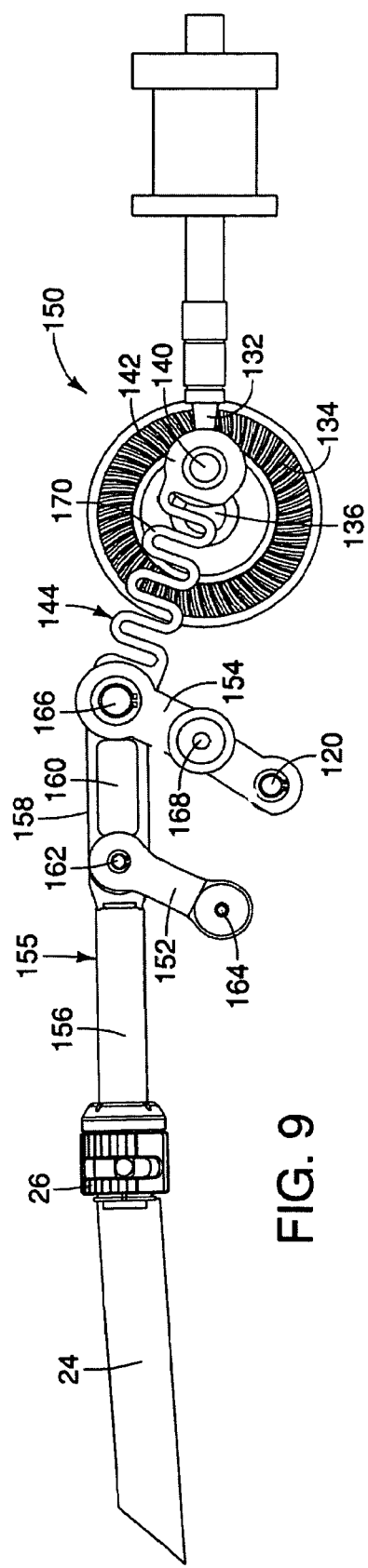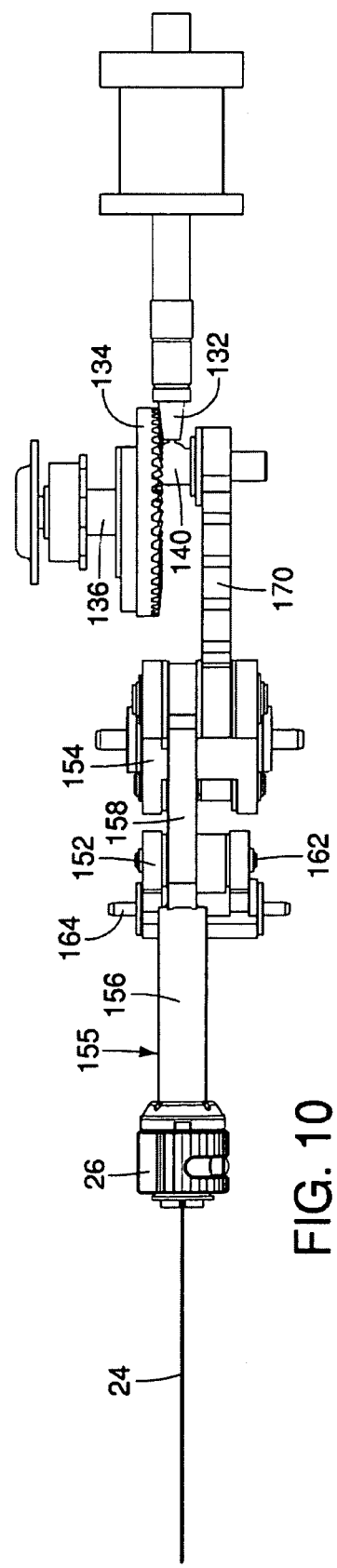

IMPACT ABSORPTION DRIVE MECHANISM FOR A RECIPROCATING TOOL

BACKGROUND OF THE INVENTION

The present invention generally relates to power hand tools, and more particularly, to power reciprocating tools.

Reciprocating tools that are motor driven, such as saber saws, larger reciprocating saws and the like are usually driven by electric motors that have a rotating output shaft. The rotating motion is translated into reciprocating motion for moving a saw blade or the like in a reciprocating manner.

Reciprocating tools such as jigsaws, saber saws, as well as larger reciprocating saws are typically driven by the rotating output shaft of an electric motor. Such tools have a mechanism that translates rotary motion of the output shaft into reciprocating motion. Among the types of mechanisms that convert the rotary motion to reciprocating motion includes a wobble plate drive mechanism as well as a crankshaft drive mechanism, both of which are well known to those of ordinary skill in the art.

Regardless of the type of drive mechanism that is employed in a reciprocating saw, it is often the case during cutting with such a saw for the saw blade to bind in the material that is being cut. When this occurs, a high energy impulse is produced which is sent through the driving component of the saw which can damage the drive mechanism among other things. Typically, one or more gears of the gear train of the drive mechanism are the components that are damaged by such high energy impulses.

Research and developmental efforts continue to be made for the purpose of proving the designs in order to minimize the possibility of such high energy impulses being propagated through the saw which could damage the drive and other components.

SUMMARY OF THE INVENTION

Embodiments are disclosed for a reciprocating saw that comprises a housing, a drive mechanism in the housing, a motor in the housing for driving the drive mechanism, an elongated plunger located in the housing for reciprocating motion and having a front end portion for attaching a saw blade for cutting material, the saw having an energy absorbing compliant configuration at least partially isolating a portion of the plunger and the drive mechanism from high energy impulses that can be produced by the saw blade being bound in the material being sawed during operation of the saw.

DESCRIPTION OF THE DRAWINGS

FIG. 2 is a plan view of the drive mechanism shown in the embodiment of FIG. 1, shown in a position at the end of a cutting stroke;

FIG. 3 is a plan view of a second preferred embodiment of a drive mechanism similar to that shown in the embodiment of FIG. 1, shown in a position at the beginning of a cutting stroke;

FIG. 4 is a top view of the drive mechanism shown in FIG. 2;

FIG. 5 is a front in view of the drive mechanism shown in FIG. 3;

FIG. 9 is a side view of a third preferred embodiment;

FIG. 10 is a top view of a portion of the third preferred embodiment shown in FIG. 9;

DETAILED DESCRIPTION

The preferred embodiments of the present invention are reciprocating drive mechanisms for a reciprocating tool such as a reciprocating saw, the general size and shape of which is similar to saws that are currently marketed. The present invention is also applicable for other types of tools such as saber saws, for example, or other types of tools that have a reciprocating action and are powered by a motor having a rotating output shaft.

As previously mentioned, reciprocating saws can easily bind into the material that is being cut which creates a high energy impulse that propagates through the reciprocating saw plunger and the drive mechanism which drives the plunger. Very often, the drive mechanism is a wobble plate drive or a crankshaft drive that interfaces the plunger with the output shaft of a drive motor. The high energy impulse can cause damage to the drive mechanism and is typically manifested in broken teeth of one or more gears in the gear train of the drive mechanism. In accordance with embodiments of the present invention, the high energy impulse that is produced by a binding action of the saw blade in the material being cut is absorbed in portions of the saw components that are designed and configured to be elastically deformed. This deformation results in the impulse being diminished which tends to prevent or minimize any damage that may otherwise be experienced by the driving components. This is achieved in various embodiments of the present invention by providing an energy absorbing compliant configuration in either the plunger or the portions of the drive mechanism itself.

A first preferred embodiment of the present invention is to selectively remove material from the plunger so that a portion of it can act as a spring or a compliant element. Thus, by cutting a spiral slot through multiple turns, the plunger can be made to act as a spring which will absorb some of the impact that results from binding of the blade in the material in which the saw is cutting. In the preferred embodiment, the compliant section is located on the plunger between the saw blade and the drive connection on the plunger. This location maximizes the number of drive train components that are protected from high energy pulses.

The drive connection on the plunger can be connected to a wobble drive or a scotch yolk drive or a crankshaft drive. In the event that a crankshaft or scotch yolk drive is used, the drive link that interconnects the crankshaft drive and the plunger can be provided with such a spiral slot if it has a relatively thin walled cylindrical configuration, or it may be in the shape of a relatively flat corrugated configuration that enables it to expand and retract in the longitudinal direction or length of the connecting link.

Figure 1:
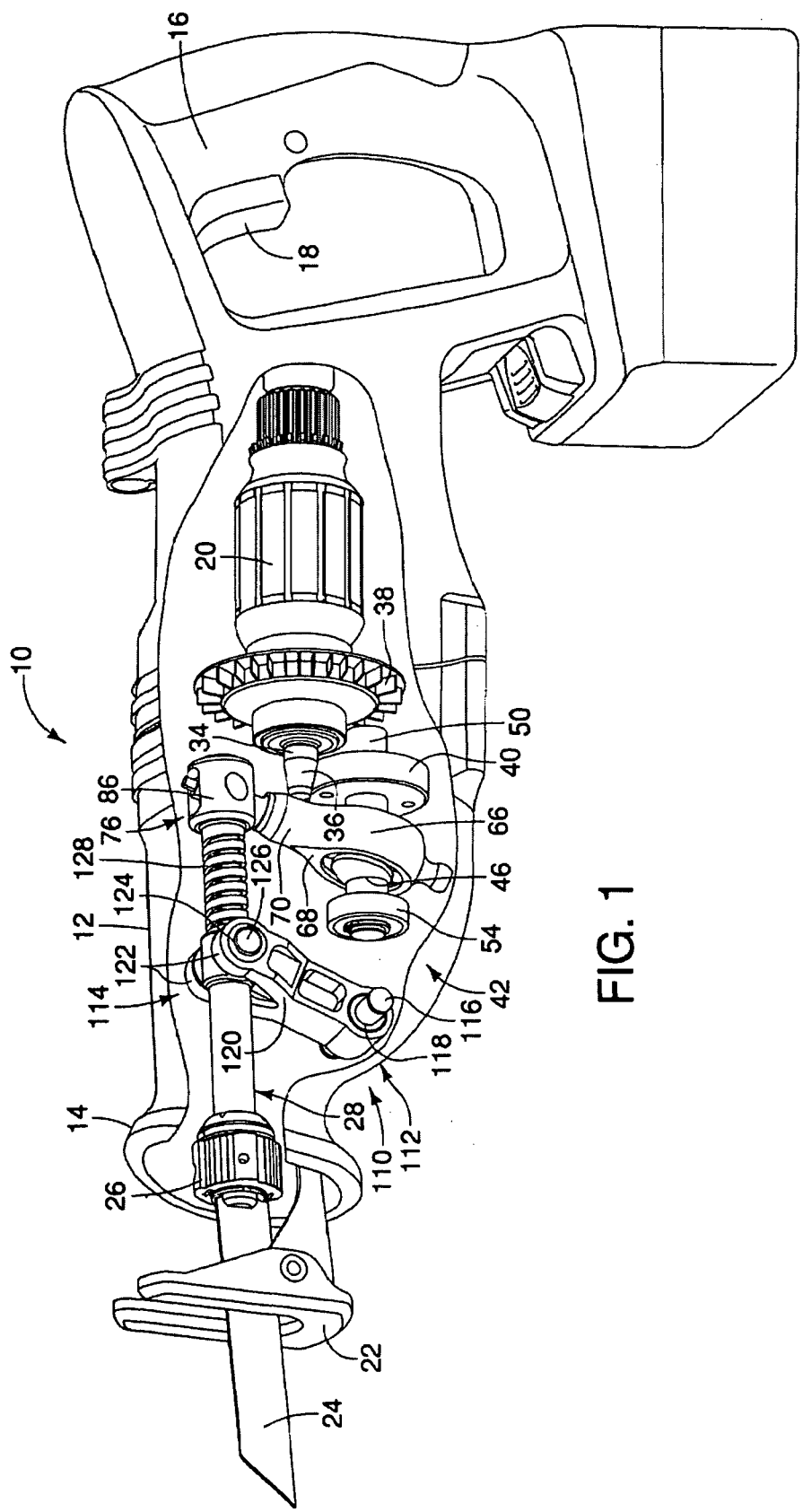
FIG. 1 FIG. 1 is a perspective view of the preferred embodiment of the present invention, shown with portions removed to illustrate the drive mechanism.

Turning now to the drawings, and referring to FIG. 1, a reciprocating saw, indicated generally at 10, has a housing 12 which includes a nose portion 14 that is flared outwardly so that a user can hold the nose portion with one hand while holding a handle 16 with the other. A trigger switch 18 is provided in the handle portion 16 for turning on a motor 20 that drives the tool. The saw has a shoe 22 at the nose end portion 14 and a saw blade 24 is mounted in a blade clamping mechanism 26 that is mounted at the end of an elongated plunger, indicated generally at 28. As shown in FIGS. 1-4, the motor 20 has an output shaft 34 with a pinion gear 36 and fan member 38 operatively attached to the shaft 34, with the gear 36 engaging a larger gear 40 that is connected to a wobble plate assembly, indicated generally at 42, which drives the plunger 28 in a reciprocating manner. The teeth of the pinion gear 36 and gear 40 are not shown for the sake of simplicity, but are conventional as is known to those of ordinary skill in the art.

More particularly, the wobble shaft assembly 42 has a drive shaft, indicated generally at 46, to which the gear 40 is attached. The shaft has an end portion that is supported in a needle bearing 50 or the like and an opposite end supported in another needle bearing 54 that is mounted in the housing 12. It should be understood that the manner in which the motor 20, gears 36 and 40 as well as the shaft 46 are mounted in the housing 12 is not shown in detail inasmuch as such is conventional and is also well known to those of ordinary skill in the art.

With regard to the wobble plate assembly 42, for and referring to FIGS. 1-3, the shaft 46 has generally cylindrical shaped portion 60 shown in phantom in FIGS. 2 and 3 that is oriented at an acute angle relative to the axis of the shaft 46. The wobble plate assembly 42 has an elongated arm 66 that is mounted in ball bearings (not shown) for rotation relative to the cylindrical portion 60, which permits the arm 66 to move in a left and right direction relative to the cylindrical portion 60 as the shaft 46 is rotated during operation.

More particularly, as the shaft 46 is rotated, the angular orientation of the cylindrical portion 60 changes, and an arm 66 of the wobble plate assembly 42 is moved in a reciprocating manner, i.e., to the left as shown in FIG. 3, and to the right as shown in FIGS. 1 and 2. As is best shown in FIG. 1, the arm 66 has generally flat sides 68 that extend from the bottom upwardly which then merges into a curved outer end member 70 that reduces in size and becomes circular shaped in cross-section.

Figure 8:
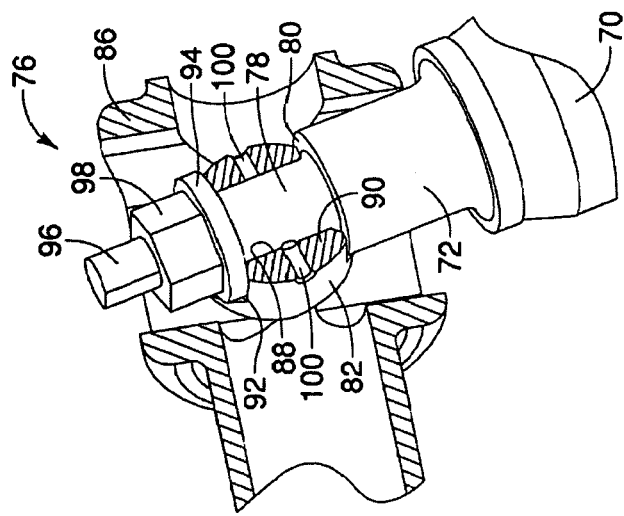
FIG. 8 is another perspective view of a portion of the drive mechanism, particularly illustrating another cross-section of the pivot connection shown in FIG. 6.
Figure 7:
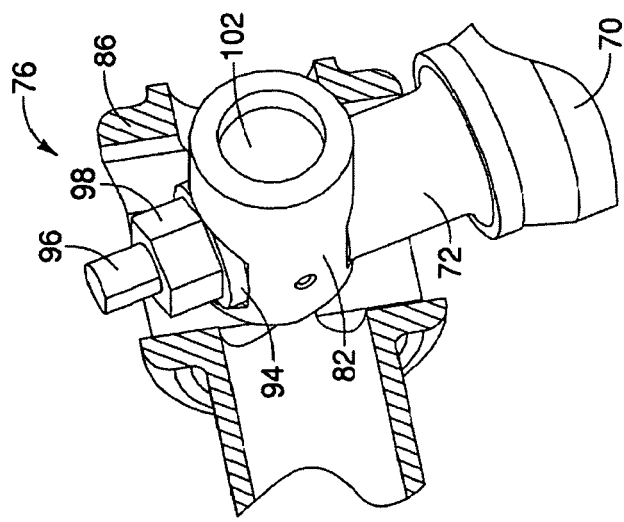
FIG. 7 is another perspective view of a portion of the drive mechanism, particularly illustrating a cross-section of the pivot connection shown in FIG. 6.
Figure 6:
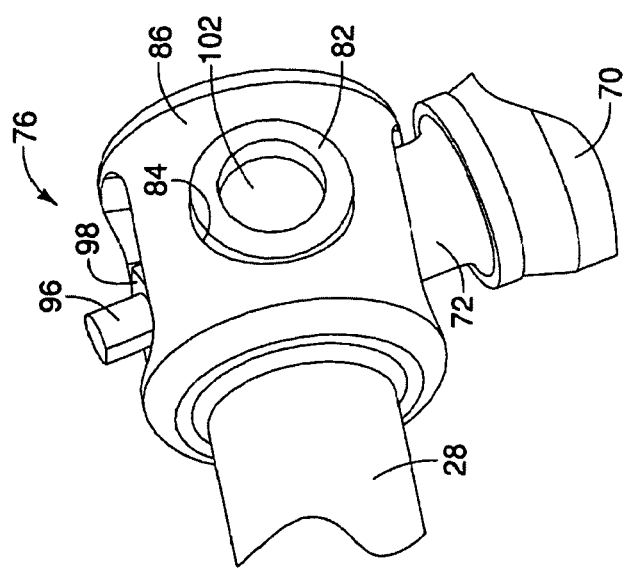
FIG. 6 is a perspective view of a portion of the drive mechanism, particularly illustrating the pivot connection of the wobble drive assembly and the plunger.

The end member 70 transitions into a cylindrical end portion 72 which connects to the plunger 28 by a pivot connection, indicated generally at 76, which is shown in FIGS. 6, 7 and 8, with FIGS. 7 and 8 being cross sections taken through the plunger 28 and portions of the pivot connection 76. The cylindrical portion 72 interfaces with a smaller diameter cylindrical portion 78 which forms an annular shoulder 80. A transverse cylindrical shaft 82 fits within an aperture 84 in the side walls of a receiver 86 that is formed or securely fixed to the rear end portion of the plunger 28. The receiver 86 also has a recess 87 that is vertically oriented in which the portions 72 and 78 can be inserted. The cylindrical shaft 82 is horizontally oriented and is configured to rotate in the aperture 84 during reciprocating motion of the plunger and arm 66 of the wobble plate assembly 42.

The cylindrical shaft 82 has a circular aperture 88 that is generally vertically oriented as shown in FIG. 8 and is sized to receive the cylindrical portion 78. The bottom of the cylindrical shaft 82 has a flat surface 90 which contacts the shoulder 80, and it also has an upper flat surface 92 that is configured to receive a washer 94, with the upper end 96 of the cylindrical portion 78 being threaded to receive a nut 98 thereon.

From the foregoing description, it should be appreciated that when the wobble plate assembly 42 reciprocates the arm 66 to the left and the right, the pivot connection 76 not only supports the rear end of the plunger 28, it enables the plunger to be driven by the wobble plate assembly 42 during operation. While not essential, small holes 100 may be provided for the purpose of introducing lubricating grease or the like into the cylindrical shaft 82 and its interface with the cylindrical portion 78. Also, while not essential, the opposite ends of the cylinder 82 may be formed or machined to provide a recess 102 for the purpose of reducing the weight of the cylinder 82.

The plunger 28 is also supported near its midpoint by an elongated rocker, indicated generally at 110, which has a lower pivot connection, indicated generally at 112, as well as an upper pivot connection, indicated generally at 114. The lower pivot connection 112 consists of a shaft 116 that is preferably secured in suitable recesses of the housing with the shaft 116 having needle bearings 118 enabling the low friction rotational movement of the elongated rocker. The rocker 112 has a split upper end 120 with two side portions 122, each of which has a needle bearing 124 in which a shaft 126 that is attached to the plunger 28 can rotate. It should be understood that the shaft 126 may actually be a unitary shaft that extends through the plunger 28, or there may be shaft portions which extend from each side of the plunger. In any event, the pivot connections enable the plunger to be reciprocated when driven by the wobble plate assembly 42.

Referring particularly to FIG. 3, it has been provided with letter designations identifying the center point of pivot connections of the wobble plate assembly 42 and the front rocker 110. More particularly, the center of the pivot connection at the base of the wobble plate assembly is identified as A whereas the center of the pivot connection 76 is marked B. Similarly, the pivot connection 112 has its center marked C and the center of the upper pivot connection 114 is marked D. As is evident from the drawing, the center C is slightly above the center A by distance d1 has been marked on the drawing. Also, on FIG. 3, the rocker 110 is shown in its furthest left position which orients the rocker slightly forward by an angle θ relative to top dead center. It can be appreciated that if the mechanism is reciprocated to the right so that the rocker 110 is straight up, i.e., top dead center, the elevation of the cutting blade 24 will be at its maximum. When it is moved completely to the left as shown in FIG. 3, it is then going to be slightly lower than its top dead center elevation position. Similarly, if it is moved to the right as shown in FIG. 2, the elevation of the rocker point B will decrease.

In accordance with an important aspect of the present invention, the portion of the plunger 28 between the pivot connection 76 and the upper pivot connection 114 has material removed in a spiral pattern in order to make this portion function as a spring-like element. In other words, a slot is preferably cut through multiple turns, in order to have the plunger act as a spring between these two connections. In the embodiment illustrated in FIGS. 1, 2, 4 and 5, the slot has approximately seven complete turns. This enables the high energy impulses that may be generated by the blade binding in the material being cut from being transferred to the pivot connection 76 so that further propagation to the wobble plate drive mechanism is substantially reduced. This significantly reduces the likelihood that the impulses will damage the wobble plate drive as well as the gears 36 and 40.

It should be understood that while the configuration of the portion 128 is shown to be a circumferential spiral slot cut into a hollow cylindrical plunger, other compliant configurations can be used, and an alternative embodiment is shown in FIG. 3 where a serpentine or corrugated section 130 is provided. The width of the serpentine or corrugated configuration as well as the thickness of the material is such that it will have the necessary structural strength to reliably drive the plunger and blade during cutting, but will flex to absorb high energy impulses that may be produced if the blade binds in the material being cut.

Another embodiment of the present invention comprises a crankshaft drive mechanism rather than a wobble plate drive mechanism. As is best shown in FIGS. 9 and 10, a pinion gear 132 mounted on an output shaft of a drive motor engages a spiral gear 134 is mounted on shaft 136 and has a post 140 to which one end 142 of a drive link, indicated generally at 144, is pivotally connected and provides the output to a rotary joint rocker mechanism, indicated generally at 150.

The rotary joint rocker mechanism 150 is comprised of a forward plunger guide rocker 152 and a plunger drive rocker 154 that is spaced rearwardly from the plunger guide rocker 152. A plunger 155 has a cylindrical portion 156 to which the clamping mechanism 26 is attached and it also has a relatively flat rear portion 158 with a weight reducing window 160. The plunger guide rocker 152 has a upper pivot connection 162 that interconnects the upper end portion of the rocker 152 to the rear portion 158 of the plunger 155 and a lower pivot connection 164 that connects the bottom portion of the plunger guide rocker 152 to the housing (not shown).

The plunger drive rocker 154 has an upper pivot connection 166 which connects the drive rocker to the rear portion 158 of the plunger 155 as well as to the outer end of the drive link 144. The plunger drive rocker 154 has a pivot connection 168 generally midway between its upper and lower end portions which is also connected to the housing (not shown). Additionally, the plunger drive rocker 154 has a lower pivot connection 170 that is not shown to be connected to anything in this embodiment but which is configured to be part of a counterweight assembly.

From the foregoing, it should be understood that rotation of the spiral gear 134 results in the drive link 144 moving the plunger drive rocker 154 from the position shown in FIG. 4 to the left and thereby causes the plunger 155 to be moved to the left. The saw blade 24 is therefore moved in a reciprocating manner with the stroke of movement preferably being approximately 1" to approximately 1¼", the stroke distance being a function of the distance between the center of the post 140 and shaft 136.

As shown in FIGS. 9 and 10, the drive link 144 has a corrugated configuration that is substantially similar to the corrugated configuration 130 shown in FIG. 3. By having the spring-like corrugated configuration 170 between the post 140 and upper connection 166, high energy impulses that may be generated by binding of the blade 24 will not propagate to the post 140 located on the spiral gear 134 and therefore the likelihood of damage to either the spiral gear 134 or its driving pinion gear 132 is minimized. While the serpentine configuration of the portion 170 of the drive link 144 shows a total of eight interconnected segments, (with six segments including a bottom curved portion and shared side portions, and two end segments having a bottom curved portion and one shared side portion) it should be understood that a larger or smaller number of corrugated segments may be utilized.

Similarly, other configurations that permit expansion and retraction of the drive link 144 in its lengthwise direction can be utilized. The important consideration is that during normal operation, rotation of the spiral gear 134 will result in the plunger 156 moving in its reciprocating path in the normal fashion, with the portion 170 only compressing or expanding in response to a high energy impulse being propagated from the blade 24 to the plunger 155. The corrugated portion 170 thereby acts as a shock absorber or compliant region.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A reciprocating saw, comprising;
    a housing;
    a drive mechanism in said housing;
    a motor in the housing for driving said drive mechanism;
    an elongated plunger located in said housing for reciprocating motion and having a front end portion for attaching a saw blade for cutting material and a rear portion opposite said front end portion;
    wherein said rear end portion of said plunger is operably connected to said drive mechanism and is driven to reciprocate by said drive mechanism to produce said reciprocating motion;
    wherein said plunger is hollow and empty and has a cylindrical outer wall portion that extends longitudinally between said front end portion and said rear portion, said cylindrical outer wall portion has a first end permanently affixed to said front end portion and a second end permanently affixed to said rear end portion, such that said outer wall portion is driven to reciprocate by the rear end portion and the front end portion is driven to reciprocate by the outer wall portion
    wherein said outer wall portion defines a spiral slot that extends through said outer wall portion for multiple turns around the circumference of said outer wall portion of said plunger to form an energy absorbing compliant configuration that results in the outer wall portion having sufficient structural strength to reciprocatingly drive the front end portion of the blade with a saw blade attached thereto to perform cutting operations and that enables said outer wall portion to expand and contract in a lengthwise direction
    to absorb high energy impulses that can be produced by the saw blade being bound in the material being sawed during operation of the saw.

2. A reciprocating saw as defined in claim 1 wherein said drive mechanism comprises a guide rocker having an upper end portion with a pivot connection to a mid portion of said plunger and a lower end portion with a pivot connection to said housing; and
    a wobble plate assembly operatively connected to said drive shaft and to said rear portion of said plunger and configured to reciprocate said plunger generally in its lengthwise direction.

3. A reciprocating saw as defined in claim 1 wherein said drive mechanism comprises a spiral gear that is driven by a drive pinion gear, said spiral gear being operatively connected to a drive link that is operatively connected to said plunger, whereby rotation of said pinion gear rotates said spiral gear and causes said drive link to move said plunger in reciprocating motion.

4. A reciprocating saw as defined in claim 3 wherein said energy absorbing compliant region comprises said drive link, wherein said link is configured to expand and contract in its lengthwise direction in a spring-like manner.

5. A reciprocating saw as defined in claim 4 wherein said drive link has a generally corrugated configuration.

6. A reciprocating saw as defined in claim 4 wherein said drive link is comprised of a hollow relatively thin walled cross sectional configuration having at least one opening therein which enables said walled portion to expand and contract in its lengthwise direction in a spring-like manner, said at least one opening comprises a spiral slot that extends through multiple turns around the circumference of said plunger.

7. A reciprocating power tool, comprising;
a housing;
a drive mechanism in said housing;
a motor in the housing for driving said drive mechanism;
an elongated plunger located in said housing for reciprocating motion and having a front end portion for attaching a tool and a rear portion opposite said front end portion;
said plunger having an outer wall portion that surrounds an empty hollow portion and that extends between said front end portion and said rear portion, said outer wall portion having a first end permanently affixed to said front end portion and a second end permanently affixed to said rear end portion, said wall portion having a spiral slot that extends through multiple turns around the circumference of said wall portion of said plunger to form an energy absorbing compliant configuration that results in the outer wall portion having sufficient structural strength to reciprocatingly drive the front end portion of the blade with a saw blade attached thereto to perform cutting operations and that enables said outer wall portion to expand and contract in a lengthwise direction to absorb high energy impulses produced by the saw blade being bound in the material being sawed during operation of the saw.

8. A reciprocating saw, comprising;
a housing;
a drive shaft rotatably mounted in said housing;
a motor in the housing for driving said drive shaft;
a generally cylindrical elongated plunger located in said housing for reciprocating motion and having a front end portion for attaching a tool, at least a portion of said elongated plunger being comprised of a wall portion surrounding an empty hollow portion;
a guide rocker having an upper end portion with a pivot connection to a mid portion of said plunger and a lower end portion with a pivot connection to said housing;
a wobble plate assembly operatively connected to said drive shaft and to a rear portion of said plunger and configured to reciprocate said plunger generally in a lengthwise direction;
wherein said wall portion of said plunger extends between said mid portion and said rear portion of said plunger, said wall portion having a first end permanently affixed to said mid portion and a second end permanently affixed to said rear portion, said wall portion having a spiral slot that extends through multiple turns around the circumference of said wall portion of said plunger to form an energy absorbing compliant configuration that results in said wall portion having sufficient structural strength to reciprocatingly drive the front end portion of the blade with a saw blade attached thereto to perform cutting operations and that enables said walled portion to expand and contract in the lengthwise direction in response to high energy impulses produced by the saw blade being bound in the material being sawed during operation of the saw.

9. A reciprocating saw as defined in claim 8 wherein said wall portion is located between said mid portion and said rear portion.

10. A reciprocating saw as defined in claim 8 wherein said wall portion has a cylindrical cross section with a relatively thin wall.

11. A reciprocating saw as defined in claim 8 wherein said spiral slot is formed by removing material from said walled portion.

\* \* \* \* \*